(12) United States Patent
Bergmann et al.

(10) Patent No.: US 12,722,697 B2
(45) Date of Patent: Sep. 1, 2026

(54) METHOD FOR OPERATING A STEERING SYSTEM OF A VEHICLE AND VEHICLE STEERING SYSTEM

(71) Applicants: ZF Automotive Germany GmbH, Alfdorf (DE); ZF Friedrichshafen AG, Friedrichshafen (DE); Zukunft Mobility GmbH, Ingolstadt (DE)

(72) Inventors: Philipp Bergmann, Duesseldorf (DE); Klaus Roth, Muelheim Ruhr (DE); Andreas Knoll, Lindau (DE); Marc Schiess, Hohenfels (DE); Oliver Westphal, Diepholz (DE); Jonathan Scheu, Kösching (DE)

(73) Assignees: ZF Automotive Germany GmbH, Alfdorf (DE); ZF Friedrichshafen AG, Friedrichshafen (DE); Zukunft Mobility GmbH, Ingolstadt (DE)

( * ) Notice: Subject to any disclaimer, the term of this patent is extended or adjusted under 35 U.S.C. 154(b) by 105 days.

(21) Appl. No.: 18/351,114

(22) Filed: Jul. 12, 2023

(65) Prior Publication Data

US 2024/0017765 A1 Jan. 18, 2024

(30) Foreign Application Priority Data

Jul. 14, 2022 (DE) ......................... 102022207207.3

(51) Int. Cl.
*B62D 6/00* (2006.01)
*B62D 7/15* (2006.01)
*B62D 5/00* (2006.01)

(52) U.S. Cl.
CPC ............... *B62D 6/008* (2013.01); *B62D 7/15* (2013.01); *B62D 5/006* (2013.01)

(58) Field of Classification Search
CPC .......... B62D 6/008; B62D 7/15; B62D 7/159; B62D 5/003; B62D 5/006; B62D 5/0484; B62D 5/0481; B62D 5/0463
See application file for complete search history.

(56) References Cited

U.S. PATENT DOCUMENTS 4,979,115 A * 12/1990 Takahashi .............. B62D 7/159 701/41
5,014,801 A * 5/1991 Hirose ................. B62D 7/1581 701/43

(Continued)

FOREIGN PATENT DOCUMENTS

DE 102012015988 A1 10/2014
DE 102018207215 A1 11/2019

*Primary Examiner* — Logan M Kraft
*Assistant Examiner* — Sherman D Manley
(74) *Attorney, Agent, or Firm* — Kristin L. Murphy

(57) ABSTRACT

The disclosure relates to a method for operating a steering system of a vehicle having a front-axle steering assembly, a rear-axle steering assembly and a steering wheel. The method involves detecting a failure of the front-axle steering assembly, steering the vehicle exclusively via the rear-axle steering assembly based on a steering command issued by a driver via the steering wheel, comparing at least one detected physical value of the steering command with a limit value associated with the rear-axle steering assembly and, provided the at least one associated limit value is reached or exceeded by the at least one detected physical value of the steering command, applying a torque acting on the steering wheel via the electric motor coupled to the steering wheel, which torque counteracts the steering command.

17 Claims, 4 Drawing Sheets

(56) References Cited

U.S. PATENT DOCUMENTS 5,369,349 A * 11/1994 Tsuchiya .............. B62D 5/0487
388/903
9,637,167 B2 * 5/2017 Miyasaka ................ B62D 6/10
2002/0038171 A1 * 3/2002 Deguchi ............ B62D 15/0265
180/443
2008/0289897 A1 * 11/2008 Williams ............... B62D 5/003
180/402
2009/0125188 A1 * 5/2009 Broecker ............. B62D 5/0463
701/42
2009/0177348 A1 * 7/2009 Yanagi ................... B62D 7/148
701/31.7
2009/0210113 A1 * 8/2009 Auguet .................. B62D 5/003
701/42
2011/0106382 A1 * 5/2011 Kageyama ............... B62D 6/04
701/42
2019/0270478 A1 * 9/2019 Kim ..................... B62D 15/025
2020/0039580 A1 * 2/2020 Redeker ................. B62D 7/148
2020/0298902 A1 * 9/2020 Bergmann ............. B62D 3/126
2020/0377150 A1 * 12/2020 Hidaka ................ B62D 5/0484

* cited by examiner

METHOD FOR OPERATING A STEERING SYSTEM OF A VEHICLE AND VEHICLE STEERING SYSTEM

CROSS-REFERENCE TO RELATED APPLICATION

This application claims priority to German Priority Application No. 102022207207.3, filed Jul. 14, 2022, the disclosure of which is incorporated herein by reference in its entirety.

TECHNICAL FIELD

The disclosure relates to a method for operating a steering system of a vehicle and to a vehicle steering system.

BACKGROUND

In vehicles with a front-axle steering assembly and rear-axle steering assembly, if the front-axle steering assembly fails entirely, there is the option of steering the vehicle via the rear-axle steering assembly, for example, in order to thereby maintain a certain maneuverability of the vehicle.

This mode of operation is particularly suitable with regard to vehicles having steer-by-wire steering as a fallback option, since a mechanical connection between the front-axle steering assembly and the steering wheel is not present here. It goes without saying that there is also no direct mechanical connection between the steering wheel and the rear-axle steering assembly.

The aim here is to establish as natural and predictable a driving behavior for the driver as possible in spite of a failure of the front-axle steering assembly, so that the vehicle may be controlled as intuitively as possible.

In normal driving mode, the rear-axle steering assembly of vehicles assumes only a supplementary steering function to the front-axle steering assembly in order to thus improve the turning circle or positively influence the driving behavior, for example. In general use, therefore, rear-wheel steering is not on a level with front-wheel steering in terms of maneuverability.

This is demonstrated, for example by the slower adjustment speed compared to front-wheel steering and also by the limited steering angle which may be applied to the rear wheels when compared to front-wheel steering.

A consequence of this may be that, if the front-axle steering assembly fails and the vehicle is steered exclusively by the rear-axle steering assembly via the steering wheel based on of the steering command of the driver, it is not possible for the rear-axle steering assembly to implement each steering command quickly enough, which means that the issued steering command may only be executed with a delay. It may furthermore occur that the driver issues a steering command via the steering wheel which demands a steering angle of the rear wheels which may not be realized owing to the limited steering angle compared to the front-axle steering assembly.

The consequence of this is that the vehicle either responds to the steering command with a delay or, if the maximum possible steering angle of the rear-axle steering assembly has been reached, it no longer responds at all.

If the vehicle responds with a delay, it may occur that the driver specifies a significantly greater steering angle of the rear wheels than intended via the steering command, which means that, as soon as the unintentionally severe steering angle has been set, the driver has to counter-steer in order to compensate for the inadvertently severe steering command.

However, if the adjustment speed of the rear-axle steering assembly which is specified by this compensating steering command also exceeds the maximum adjustment speed, the rear-axle steering assembly again responds with a delay and, in certain circumstances, the driver has to counter-steer a further time. This may cause the vehicle to sway, which should be prevented.

Against this background, what is needed is a method and a vehicle steering system which, in the event of a failure of the front-axle steering assembly, enable a safe and, for the driver, as intuitive a driving behavior as possible via the rear-axle steering assembly.

SUMMARY

In one exemplary arrangement, a method for operating a steering system of a vehicle having a front-axle steering assembly with a rear-axle steering assembly, a steering wheel for issuing a steering command and an electric motor coupled to the steering wheel, is disclosed. The method has the following steps:

a) detecting a failure of the front-axle steering assembly;

b) steering the vehicle exclusively using the rear-axle steering assembly on the basis of the steering command issued by the driver via the steering wheel;

c) comparing at least one detected physical value of the steering command with at least one limit value associated with the rear-axle steering assembly; and d) provided the at least one associated limit value is reached or exceeded by the at least one detected physical value of the steering command, applying a torque acting on the steering wheel via the electric motor coupled to the steering wheel, which torque counteracts the steering command and has a magnitude which is dependent on the detected physical value and the current driving status.

The disclosure provides the driver with feedback in the event of a failure of the front-axle steering assembly, which feedback takes the form of a torque which is, in particular additionally, applied to the steering wheel and counteracts the steering command of the driver as soon as the invoked steering command may no longer be realized due to the limited adjustment speed and the limited steering angle of the rear-axle steering assembly. In one exemplary arrangement, this torque is an extension of the manual torque already applied, which may, inter alia, comprise components with a resilient characteristic and/or damping characteristic.

The steering movement of the driver, who issues the steering command, is therefore damped to a certain extent or even stopped entirely, so that the vehicle responds to the steering command at least approximately in real time and the driving behavior can be predicted by the driver.

Accordingly, it is ensured that the steering behavior of the vehicle always corresponds to the steering movement, i.e. the steering command, applied by the driver via the steering wheel.

If the maximum adjustment angle of the rear-axle steering assembly is reached, the motor simulates a steering stop. In this state, the magnitude of the applied torque is only dependent on the detected physical value.

An exemplary aspect of the disclosure makes provision for steps c) and d) to be executed continuously by an on-board control so long as a failure of the front-axle steering assembly is detected in step a).

It is therefore ensured that the driving behavior of the vehicle can be predicted by the driver of the vehicle on a continuous basis and the vehicle may still be safely maneuvered in the event of a failure of the front-axle steering assembly.

If a failure of the front-axle steering assembly is detected in step a), the alignment of the front-axle steering assembly may be locked. This ensures that, in the event of a failure of the front-axle steering assembly, undesired steering angles of the front-axle steering assembly which might negatively influence the driving behavior and hinder the steering of the vehicle cannot occur whilst the vehicle is controlled by the rear-axle steering assembly.

If a failure of the front-axle steering assembly is detected in step a), the steering angle of the vehicle wheels of the rear-axle steering assembly may be adapted to that of the vehicle wheels of the front-axle steering assembly so that, when the vehicle is driving straight ahead, possibly with a slip angle, the center planes of all vehicle wheels are aligned parallel to each other.

This enables the vehicle to continue to drive straight ahead despite the failure of the front-axle steering assembly and the possible steering angle at the front-axle steering assembly, since the vehicle wheels of the rear-axle steering assembly compensate this steering angle. Accordingly, although there is an axle offset, the vehicle continues to drive straight ahead. This makes it easier for the driver to control the vehicle.

If a failure of the front-axle steering assembly is detected in step a), the neutral position of the steering wheel may be adjusted and then adopted when the center planes of all vehicle wheels are aligned parallel to each other.

The new orientation of the steering wheel additionally makes it easier for the driver to safely control the vehicle, since this clearly indicates to the driver when the steering angle is neutral, in which case the vehicle drives straight ahead.

The at least one physical value of the steering command may be the adjustment angle and/or the angular speed of the steering wheel.

If the physical value of the steering command is the adjustment angle, it is ensured that it is always known how severe the driver-specified steering angle of the vehicle wheels of the rear-axle steering assembly should be.

If the physical value of the steering command is the angular speed of the steering wheel, it is always ensured that it is known how high the driver-specified adjustment speed of the rear-axle steering assembly, and therefore also the vehicle wheels, should be.

The limit value of the at least one physical value of the steering command may be determined from the maximum possible adjustment speed of the rear-axle steering assembly and/or from the maximum possible steering angle of the rear-axle steering assembly in both steering directions in each case.

If the maximum possible adjustment speed of the rear-axle steering assembly is used for the limit value, it is ensured that the driver is never able to give steering commands which would theoretically result in a greater adjustment speed of the rear-axle steering assembly than the actual maximum adjustment speed of the rear-axle steering assembly. Therefore, delayed steering of the vehicle upon a steering command executed by the driver never occurs since this command is limited in terms of its maximum steering speed at the steering wheel by the torque applied at the steering wheel.

If the limit value is produced from the maximum possible steering angle of the rear-axle steering assembly, it is ensured that the driver, when adjusting the steering wheel by turning the steering wheel, may only issue a command which may be realized by the maximum possible steering angle of the rear-axle steering assembly.

It is conceivable here that the maximum possible steering angle of the rear-axle steering assembly is quite different in both directions since compensation of the angled vehicle wheels on the front-axle steering assembly is possibly already taking place in one steering direction. Therefore, a certain steering angle is already adopted in this direction so that the maximum possible steering angle is smaller than the maximum possible steering angle in the other steering direction.

If the limit value is determined from both the maximum possible adjustment speed of the rear-axle steering assembly and the maximum possible steering angle of the rear-axle steering assembly, the above advantages are combined.

Moreover, further factors may also be involved in determining the limit value.

If the limit value is exceeded or reached, the torque acting on the steering wheel in step d) may advantageously counteract the steering movement of the driver in such a way that the maximum possible angular speed of the steering wheel is limited depending on the maximum possible adjustment speed of the rear-axle steering assembly and/or the maximum possible adjustment angle of the steering wheel is limited depending on the maximum possible steering angle of the rear-axle steering assembly in both directions in each case.

If the maximum possible angular speed of the steering wheel is limited depending on the maximum possible adjustment speed, steering movements by the driver are braked by the torque acting on the steering wheel as soon as they specify a greater adjustment speed of the rear-axle steering assembly than the maximum possible adjustment speed due to the angular velocity of the steering wheel. A steering movement below a certain angular velocity of the steering wheel is therefore still possible.

If the steering angle of the rear-axle steering assembly which is specified by the driver via the adjustment angle applied to the steering wheel corresponds to the maximum steering angle, a torque acting on the steering wheel is applied, which forms a stop and permits no further adjustment of the steering wheel in the direction which would result in an additional steering angle of the rear-axle steering assembly in the steering direction in which the maximum possible steering angle has been reached.

A vehicle steering system is also disclosed. In one exemplary arrangement, the steering system has a front-axle steering assembly, a rear-axle steering assembly, a steering wheel for issuing a steering command, a sensor system associated with the steering wheel to detect the steering command, an electric motor coupled to the steering wheel to apply a torque to the steering wheel and a control, which is coupled to the front-axle steering assembly, to the rear-axle steering assembly, to the sensor system and to the electric motor, wherein the control is designed to control the rear-axle steering assembly on the basis of the steering command at the steering wheel if the front-axle steering assembly fails and to activate the electric motor to deliver a torque which is contrary to the steering command if at least one limit value of the steering command is reached or exceeded, wherein the limit value is dependent on at least one physical parameter of the rear-axle steering assembly.

The advantages thereof can be found in the explanations above.

The vehicle steering system may be designed to carry out the method according to the disclosure.

Accordingly, the front-axle steering assembly may comprise a first electric actuator for adjusting the front wheels and/or the rear-axle steering assembly may comprise a second electric actuator for adjusting the rear wheels.

The sensor system may advantageously comprise an angle sensor for detecting the adjustment angle of the steering wheel and a rotation sensor for detecting the angular speed of the steering wheel. These sensors are coupled to the control to transmit signals so that the steering command issued by the driver is always known.

BRIEF DESCRIPTION OF DRAWINGS

The disclosure is described below with reference to an exemplary arrangement which is illustrated in the accompanying drawings, in which.

DETAILED DESCRIPTION

Figure 1:
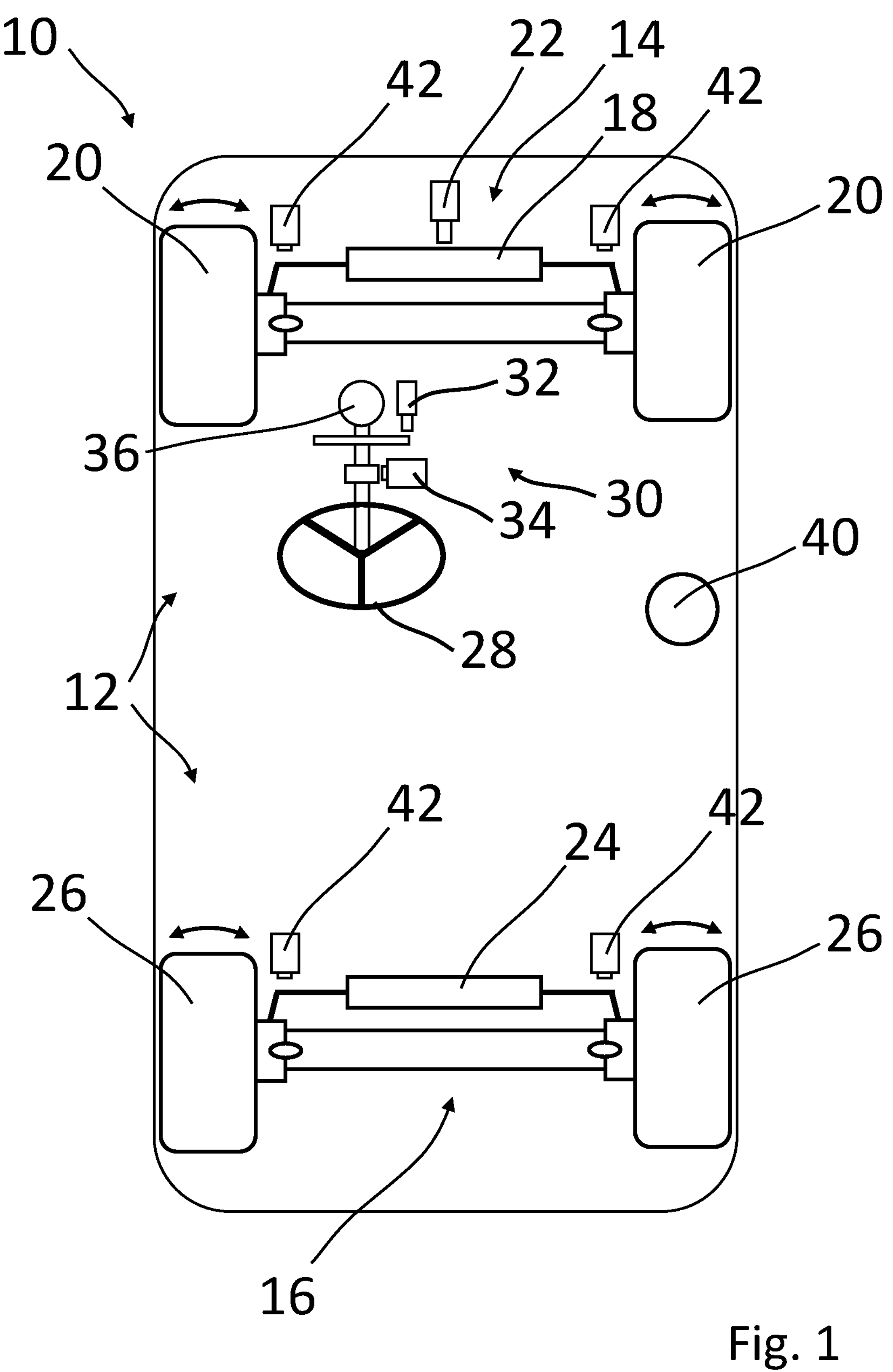
FIG. 1 shows, in plan view, a schematic drawing of a vehicle equipped with a vehicle steering system according to the disclosure, by which the method according to the disclosure is carried out.

FIG. 1 shows a vehicle 10 having a vehicle steering system 12.

The vehicle steering system 12 has a front-axle steering assembly 14 and a rear-axle steering assembly 16.

The front-axle steering assembly 14 comprises a first electric actuator 18, which serves to adjust two front wheels 20 so that their steering angle can be set via the first electric actuator 18.

It is furthermore also conceivable that the front-axle steering assembly 14 comprises two individual electric actuators, which permit individual adjustment of the front wheels 20.

Moreover, a blocking mechanism 22 is associated with the front-axle steering assembly 14, which blocking mechanism blocks the adjustment of the front-axle steering assembly 14 in the activated position and therefore locks the front wheels 20 in their alignment.

The blocking mechanism 22 here may engage in the steering rack via an electric actuator, for example, or even engage directly in the first electric actuator 18 and block the mechanism.

The rear-axle steering assembly 16 comprises a second electric actuator 24, which serves to adjust the rear wheels 26 so that their steering angle can be set via the second electric actuator 24.

The vehicle steering system 12 moreover comprises a steering wheel 28.

A mechanical connection between the steering wheel 28 and the front-axle steering assembly 14 is not provided. The vehicle steering system 12 is therefore a steer-by-wire system.

Furthermore, there is also no mechanical connection between the steering wheel 28 and the rear-axle steering assembly 16.

A sensor system 30 is furthermore associated with the steering wheel 28 to detect the steering command of the driver.

The sensor system 30 comprises an angle sensor 32, which serves to detect the adjustment angle of the steering wheel 28.

Moreover, the sensor system 30 comprises a rotation sensor 34, which serves to detect the angular speed of the steering wheel 28.

Moreover, the steering wheel 28 is mechanically coupled to an electric motor 36, which is designed to apply a torque to the steering wheel contrary to the steering torque applied by the driver.

The vehicle steering system 12 furthermore comprises an on-board control 40, which is coupled to the front-axle steering assembly 14 and to the electric actuator 18 associated with the front-axle steering assembly 14, to the rear-axle steering assembly 16 and to the electric actuator 24 associated with the rear-axle steering assembly 16, to the blocking mechanism 22, to the sensor system 30 and to the electric motor 36.

Additional sensors 42 may also be provided in order to detect the steering angle of the vehicle wheels 20, 26 and to provide these steering angles to the on-board control 40 in the form of a signal.

The method for operating the vehicle steering system 12 is explained below with the aid of FIGS. 1 to 4.

In FIG. 1, the steering wheel 28 is in a neutral position, so that the front wheels 20 of the front-axle steering assembly 14 and also the rear wheels 26 of the rear-axle steering assembly 17 have no steering angle. The vehicle 10 is therefore driving straight ahead.

Figure 2:
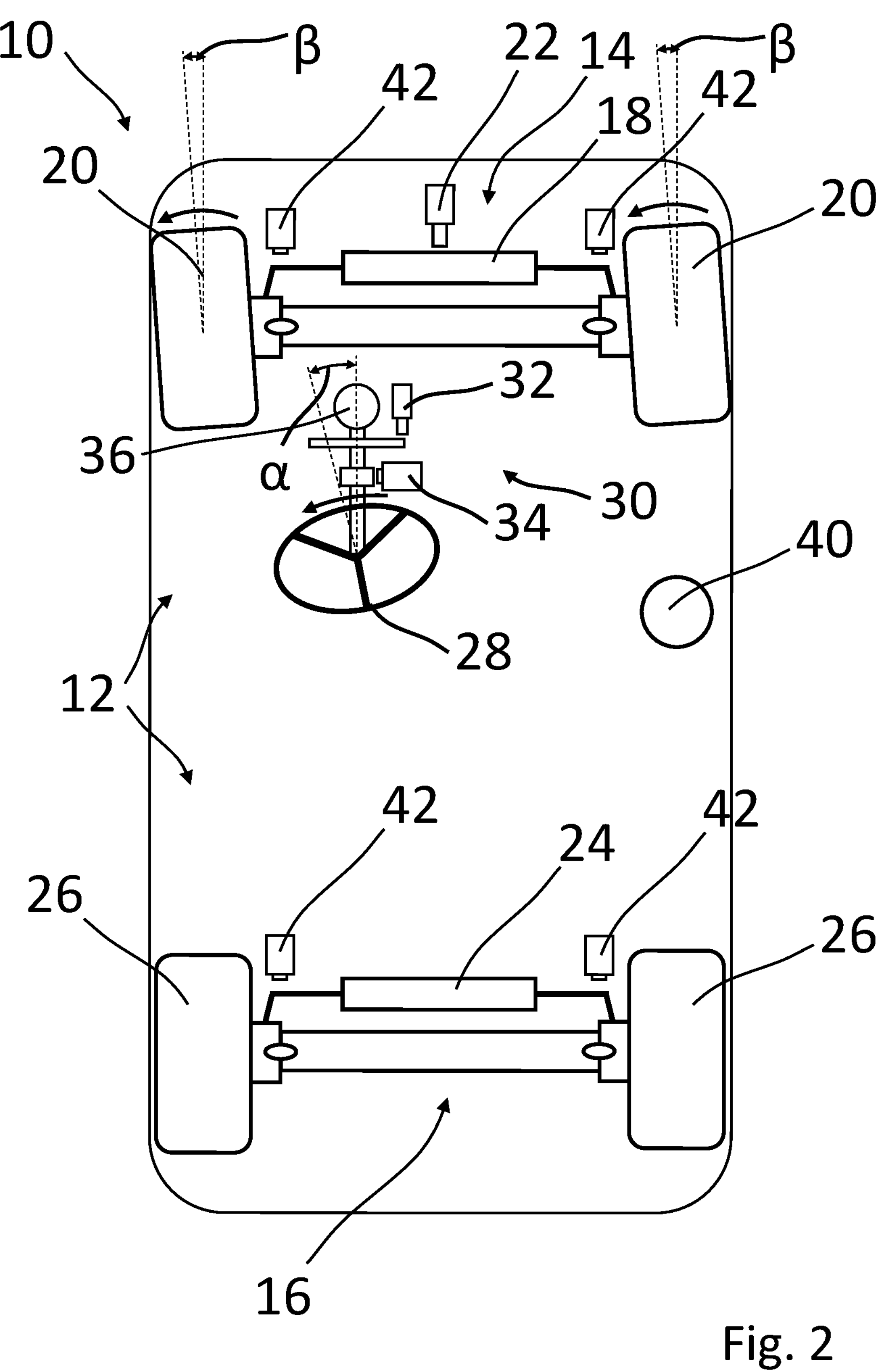
FIG. 2 shows a schematic drawing of the vehicle with angled front wheels.

In FIG. 2, on the other hand, the vehicle 10 is cornering. A steering command is applied to the steering wheel 28 here and the steering wheel has an adjustment angle $\delta_L$.

Owing to the steering command, a steering angle $\delta$ is also applied to the front wheels 20 via the first electric actuator 18 of the front-axle steering assembly 14.

In addition to this, it is also conceivable that a steering angle is applied to the rear wheels 26 via the second electric actuator 24 of the rear-axle steering assembly 16, which steering angle assists the cornering specified by the steering command (not shown in FIG. 2).

If, when driving, the on-board control 40 detects that the front-axle steering assembly 14 has failed, the affected front-axle steering assembly 14 is locked in its current alignment. This takes place by activating the blocking mechanism 22 (see FIG. 3).

Figure 3:
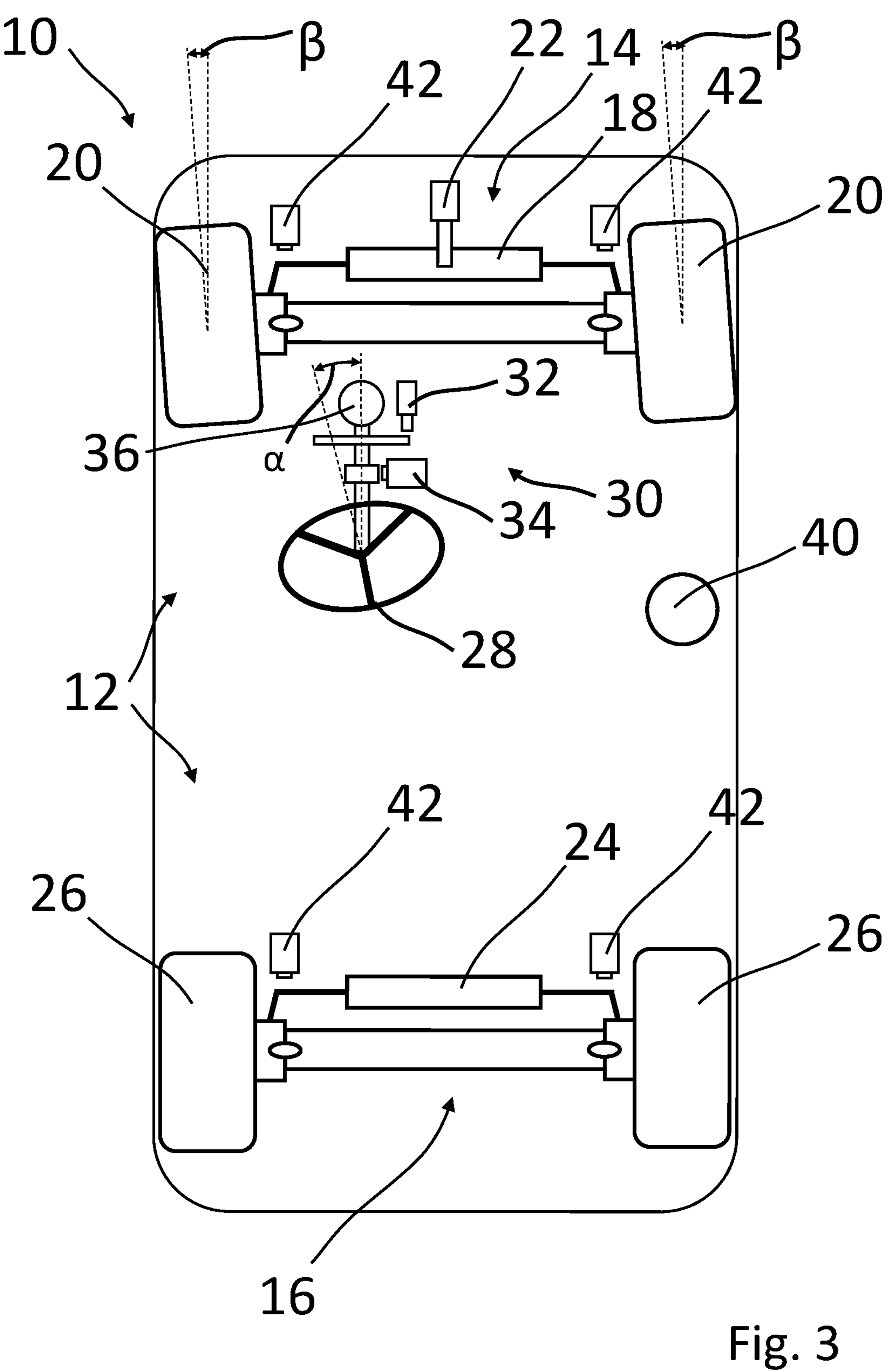
FIG. 3 shows a schematic drawing of the vehicle with angled front wheels and a locked front-axle steering assembly.

It is firstly irrelevant here whether the vehicle is driving straight ahead or whether the front wheels 20 have a steering angle $\delta$, as illustrated in FIG. 3.

Figure 4:
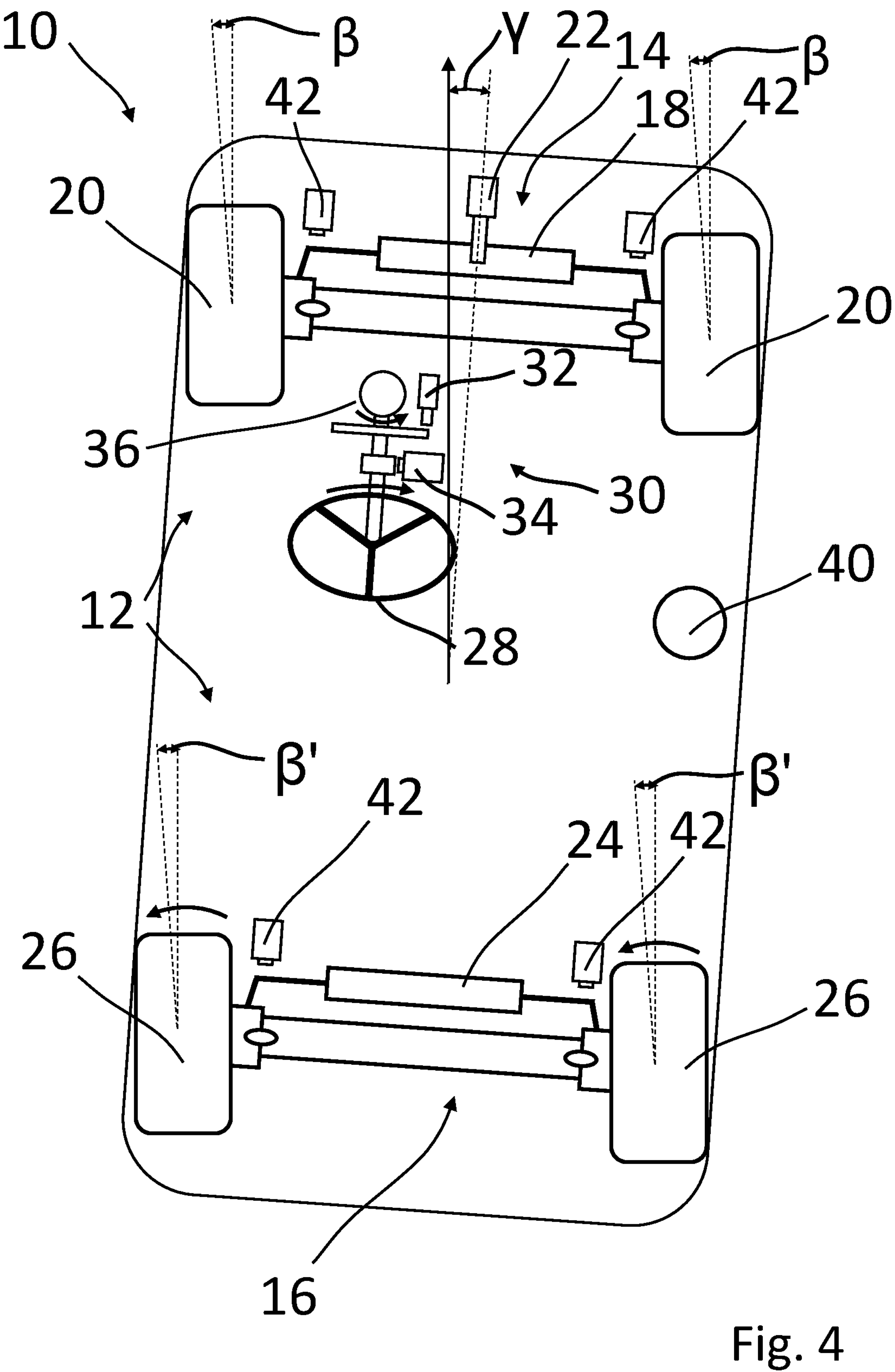
FIG. 4 shows a schematic drawing of the vehicle with angled front and rear wheels when driving straight ahead with a slip angle.

After locking the front-axle steering assembly or even directly after detecting that the front-axle steering assembly 14 has failed, the steering angle $\delta'$ of the rear wheels 26 may moreover be adapted to that of the front wheels 20 of the front-axle steering assembly via the rear-axle steering assembly 16 (see FIG. 4).

As a result, even when the front-axle steering assembly 14 is blocked by the blocking mechanism 22, with front wheels 20 which have a steering angle $\delta$, the vehicle 10 drives straight ahead with a slip angle $\beta$, since the center planes of all wheels are aligned parallel to each other as a result of the adaptation of the steering angle $\delta'$ of the rear wheels 26.

It is additionally conceivable that the steering wheel 28 is adjusted by the electric motor 36 in such a way that the neutral position of the steering wheel 28 is adopted when the center planes of all vehicle wheels 20, 26 are aligned parallel to each other so that the vehicle 10 is driving straight ahead.

In a next step, in the event of a failure of the front-axle steering assembly 14, the steering of the vehicle 10 via the control 40 only takes place through the adjustment of the rear-axle 16 based on the steering command at the steering wheel 28

The steering command issued by the driver via the steering wheel 28 is detected by the sensor system 30 here and, on the basis thereof, a steering angle δ' is applied to the rear wheels 26 of the rear-axle steering assembly 16 via the second electric actuator 24.

Subsequently, the physical values of the steering command which are detected via the angle sensor 32 and the rotation sensor 34 of the sensor system 30 are each compared to a limit value associated with the rear-axle steering assembly 16 via the control 40.

The physical values of the steering command are the adjustment angle $\delta_L$ of the steering wheel and the angular speed with which the steering wheel 28 is adjusted.

The limit value for the adjustment angle $\delta_L$ here is determined from the maximum possible steering angle δ' of the rear-axle steering assembly 16. The steering angle δ' of the rear-axle steering assembly 16 through which the rear-axle steering assembly may be adjusted may be greater in one steering direction than in the other since, as shown in FIG. 4, the steering angle δ of the front-axle steering assembly 14 is likewise compensated by an angled rear-axle steering assembly 16.

Accordingly, a certain adjustment angle $\delta_L$ of the steering wheel corresponds to an adjustment angle δ' of the rear-axle steering assembly 16. If the adjustment angle $\delta_L$ at the steering wheel 28 is further increased, the steering angle δ' of the rear-axle steering assembly 16 also increases. However, this is only possible until the maximum steering angle δ' of the rear-axle steering assembly 16 is reached and this rear-axle steering assembly has reached a stop.

If the adjustment angle 6L of the steering wheel 28 which is recorded by the angle sensor 32 reaches a size which corresponds to a maximum possible steering angle δ' of the rear-axle steering assembly 16, a torque is applied to the steering wheel 28 by the electric motor 36, which torque counteracts the steering command if the driver is attempting to further increase the adjustment angle $\delta_L$ of the steering wheel 28.

The electric motor 36 is activated via the on-board control 40.

This torque which acts on the steering wheel 28 as a result of the electric motor 36 therefore simulates a stop at the steering wheel 28, via which the driver receives feedback to indicate that a further adjustment of the steering wheel 28 is not possible since the maximum steering angle δ' at the rear-wheel axle 16 has been reached.

A mechanical end stop is therefore simulated by the electric motor 36.

The limit value for the angular speed of the steering wheel 28 is determined from the maximum possible adjustment speed of the rear-axle steering assembly 16.

The angular speed with which the driver adjusts the steering wheel 28 therefore determines the adjustment speed with which the rear-axle steering assembly 16 adjusts the rear wheels 26 via the second electric actuator 24.

If the angular speed with which the steering wheel 28 is adjusted is so high that it calls for an adjustment speed of the rear-axle steering assembly 16 which can no longer be realized, a torque which opposes the steering command of the driver and limits the angular speed of the steering wheel 28 is applied by the electric motor 36 coupled to the steering wheel 28.

The on-board control 40 also assumes the activation of the electric motor 36 here.

The steering wheel 28 may thus be moved maximally at an angular speed which corresponds to the maximum possible adjustment speed of the rear-axle steering assembly 16.

If the driver attempts to increase the angular speed of the steering wheel despite the counteracting torque, this is detected by the control 40 so that the magnitude of the torque applied by the electric motor 36 is increased by the control 40 depending on the steering command.

This ensures that the driver, via the steering wheel 28, does not call for an adjustment of the rear-axle steering assembly 16 which cannot be realized quickly enough and would result in the vehicle 10 responding with a delay to the steering command issued by the driver.

Damping of the steering wheel 28 therefore takes place 28 as a result of the torque applied by the electric motor 36.

If the driver reduces the angular speed of the steering wheel 28, the torque applied by the electric motor 36 is lifted so long as none of the associated limit values is exceeded.

It is furthermore also conceivable that additional factors are used for the limit value and the vehicle steering system 12 is equipped with additional sensors to detect physical values.

The torque which is applied by the electric motor 36 and counteracts the steering command may additionally depend on the current driving status, for example the vehicle speed, the movement direction and the slip angle.

The invention claimed is:

1. A method for operating a steering system of a vehicle having a front-axle steering assembly, a rear-axle steering assembly, a steering wheel for issuing a steering command and an electric motor coupled to the steering wheel, the method comprising the following steps:

a) detecting a failure of the front-axle steering assembly;

b) in response to detecting the failure, locking an alignment of the front-axle assembly;

c) steering the vehicle exclusively using the rear-axle steering assembly on the basis of the steering command issued by a driver via the steering wheel;

d) continuously, by an on-board control, comparing at least one detected physical value of the steering command with at least one limit value derived from a maximum adjustment capability of the rear-axle steering assembly; and, e) upon the at least one detected physical value of the steering command reaching or exceeding at least one associated limit value, applying a torque acting on the steering wheel via the electric motor coupled to the steering wheel, wherein the torque counteracts the steering command and has a magnitude that is dynamically determined as a function of (i) the detected physical value and (ii) a current driving status comprising at least vehicle speed or slip angle, such that the torque limits further steering input that cannot be physically realized by the rear-axle steering assembly during the failure condition.

2. The method as claimed in claim 1, wherein the steps d) and e) are executed continuously by an on-board control so long as a failure of the front-axle steering assembly is detected in step a).

3. The method as claimed in claim 1, wherein, if a failure of the front-axle steering assembly is detected in step a), the steering angle of the rear wheels is adapted to that of the front wheels so that, when the vehicle is driving straight ahead, or with a slip angle, center planes of all vehicle wheels are aligned parallel to each other.

4. The method as claimed in claim 1, wherein, if a failure of the front-axle steering assembly is detected in step a), a neutral position of the steering wheel is adjusted and then adopted when center planes of all vehicle wheels are aligned parallel to each other.

5. The method as claimed in claim 1, wherein the at least one physical value of the steering command is an adjustment angle and/or an angular speed of the steering wheel.

6. The method as claimed in claim 1, wherein the limit value of the at least one physical value of the steering command is determined from a maximum possible adjustment speed of the rear-axle steering assembly and/or from the maximum possible steering angle of the rear-axle steering assembly in both directions in each case.

7. The method as claimed in claim 1, wherein, if the limit value is exceeded or reached, the torque acting on the steering wheel in step de) counteracts the steering movement of the driver in such a way that a maximum possible angular speed of the steering wheel is limited depending on a maximum possible adjustment speed of the rear-axle steering assembly and/or a maximum possible adjustment angle of the steering wheel is limited depending on the maximum possible steering angle of the rear-axle steering assembly in both directions in each case.

8. A vehicle steering system, comprising: afront-axle steering assembly, a rear-axle steering assembly, a steering wheel for issuing a steering command, a sensor system associated with the steering wheel to detect the steering command, an electric motor coupled to the steering wheel to apply a torque to the steering wheel and a control, which is coupled to the front-axle steering assembly, to the rear-axle steering assembly, to the sensor system and to the electric motor, wherein the control is designed to control the rear-axle steering assembly based on the steering command at the steering wheel upon detection of a failure of the front-axle steering assembly, and to activate the electric motor to deliver a torque which is contrary to the steering command if at least one limit value of the steering command is reached or exceeded, wherein the limit value is dependent on at least one physical parameter of the rear-axle steering assembly, wherein the at least one limit value is determined from a maximum possible adjustment speed of the rear-axle steering assembly, and/or from a maximum possible steering angle of the rear-axle steering assembly, and wherein the torque has a magnitude that is dependent on the steering command and current driving status.

9. The vehicle steering system as claimed in claim 8, wherein the vehicle steering system is configured to:

a) detect a failure of the front-axle steering assembly;

b) steer the vehicle exclusively using the rear-axle steering assembly based on the steering command issued by a driver via the steering wheel;

c) compare the at least one detected physical value of the steering command with the at least one limit value associated with the rear-axle steering assembly;

and, provided the at least one associated limit value is reached or exceeded by the at least one detected physical value of the steering command, applying a torque acting on the steering wheel via the electric motor coupled to the steering wheel.

10. The vehicle steering system as claimed in claim 8, wherein the sensor system comprises an angle sensor for detecting the adjustment angle of the steering wheel and a rotation sensor for detecting the angular speed of the steering wheel.

11. The method as claimed in claim 2, wherein, if a failure of the front-axle steering assembly is detected in step a), the alignment of the front-axle steering assembly is locked.

12. The method as claimed in claim 11, wherein, if a failure of the front-axle steering assembly is detected in step a), the steering angle of the rear wheels is adapted to that of the front wheels so that, when the vehicle is driving straight ahead, or with a slip angle, -center planes of all vehicle wheels are aligned parallel to each other.

13. The method as claimed in claim 12, wherein, if a failure of the front-axle steering assembly is detected in step a), a neutral position of the steering wheel is adjusted and then adopted when center planes of all vehicle wheels are aligned parallel to each other.

14. The method as claimed in claim 13, wherein the at least one physical value of the steering command is an adjustment angle and/or an angular speed of the steering wheel.

15. The method as claimed in claim 14, wherein the limit value of the at least one physical value of the steering command is determined from a maximum possible adjustment speed of the rear-axle steering assembly and/or from the maximum possible steering angle of the rear-axle steering assembly in both directions in each case.

16. The method as claimed in claim 15, wherein, if the limit value is exceeded or reached, the torque acting on the steering wheel in step de) counteracts the steering movement of the driver in such a way that a maximum possible angular speed of the steering wheel is limited depending on a maximum possible adjustment speed of the rear-axle steering assembly and/or a maximum possible adjustment angle of the steering wheel is limited depending on the maximum possible steering angle of the rear-axle steering assembly in both directions in each case.

17. The vehicle steering system as claimed in claim 9, wherein the sensor system comprises an angle sensor for detecting the adjustment angle of the steering wheel and a rotation sensor for detecting the angular speed of the steering wheel.

* * * * *